(12) United States Patent
Vierling

(10) Patent No.: US 7,014,683 B2
(45) Date of Patent: Mar. 21, 2006

(54) METHOD FOR THE REGENERATION OF HUMIDITY-LADEN PROCESS AIR AND ARRANGEMENT FOR CARRYING OUT SAID METHOD

(75) Inventor: Andreas Vierling, Trebur (DE)

(73) Assignee: Wittmann Robot Systeme GmbH, Schwaig (DE)

( * ) Notice: Subject to any disclaimer, the term of this patent is extended or adjusted under 35 U.S.C. 154(b) by 0 days.

(21) Appl. No.: 10/472,620

(22) PCT Filed: Apr. 5, 2002

(86) PCT No.: PCT/DE02/01334

§ 371 (c)(1),
(2), (4) Date: Jan. 5, 2004

(87) PCT Pub. No.: WO02/081059

PCT Pub. Date: Oct. 17, 2002

(65) Prior Publication Data

US 2004/0173095 A1  Sep. 9, 2004

(51) Int. Cl.
*B01D 53/04* (2006.01)
*B01D 53/26* (2006.01)

(52) U.S. Cl. ............ 95/115; 95/120; 95/123; 95/124; 95/126; 96/128; 96/130; 96/144

(58) Field of Classification Search ............ 95/97–99, 95/104, 105, 117, 122–126, 115, 120; 96/126–128, 96/130, 143, 144, 146

See application file for complete search history.

(56) References Cited

U.S. PATENT DOCUMENTS

| | | | | |
|---|---|---|---|---|
| 2,345,774 A | * | 4/1944 | Simpson | 95/105 |
| 2,699,837 A | * | 1/1955 | Note | 96/127 |
| 3,016,978 A | * | 1/1962 | Hull | 96/113 |
| 3,359,706 A | * | 12/1967 | Zankey | 95/18 |
| 3,621,585 A | * | 11/1971 | Robertson | 34/375 |
| 3,766,713 A | * | 10/1973 | Leonard | 95/19 |
| 3,950,154 A | * | 4/1976 | Henderson et al. | 96/126 |
| 4,314,828 A | * | 2/1982 | Saito et al. | 95/97 |
| 4,484,933 A | * | 11/1984 | Cohen | 95/124 |
| 4,509,272 A | * | 4/1985 | Graff | 34/473 |
| 4,536,197 A | * | 8/1985 | Cook | 96/122 |
| 4,601,114 A | | 7/1986 | Noguchi | |
| 4,858,335 A | | 8/1989 | Roth | |
| 5,087,178 A | * | 2/1992 | Wells | 418/1 |
| 5,659,974 A | * | 8/1997 | Graeff | 34/378 |
| 5,779,768 A | * | 7/1998 | Anand et al. | 95/99 |
| 5,846,295 A | * | 12/1998 | Kalbassi et al. | 95/105 |

FOREIGN PATENT DOCUMENTS

| | | |
|---|---|---|
| DE | 34 12 173 | 10/1985 |
| DE | 197 57 537 | 7/1999 |
| GB | 474 976 | 11/1937 |

* cited by examiner

*Primary Examiner*—Robert H. Spitzer
(74) *Attorney, Agent, or Firm*—Jordan and Hamburg LLP

(57) ABSTRACT

A method for the regeneration of humidity-laden drying cartridges includes heating to 220 to 300° C. and introducing it into a drying cartridge for regeneration. Subsequent cooling of the drying cartridge is achieved by a partial stream of air diverted from the dried process air. An arrangement suitable for carrying out the method is also disclosed.

7 Claims, 2 Drawing Sheets

METHOD FOR THE REGENERATION OF HUMIDITY-LADEN PROCESS AIR AND ARRANGEMENT FOR CARRYING OUT SAID METHOD

BACKGROUND OF THE INVENTION

The invention relates to a method for regenerating moisture-laden process air as well as to an arrangement for carrying out the method.

In numerous manufacturing processes, especially when processing plastics, the starting materials and/or the intermediate products must be dried before they are processed further. At the same time, the process air, used for the drying process, accumulates moisture, which was withdrawn from the starting materials and/or the intermediate products. Basically, the so-resulting moisture-laden warm process air could be discharged untreated to the environment and replaced by fresh air. However, such a solution is incompatible with conserving energy and therefore also excluded for reasons of costs.

When plastic granulates are processed, it is necessary, as is already mentioned above, to dry the plastic granulates before they are processed or processed further. This is done by means of warm, dry air (process air), which flows through the plastic granulates in a container, provided for this purpose, takes up the moisture to begin with and then subsequently must be freed once again from the moisture taken up.

For this purpose, the process air, in which the moisture has accumulated, is subjected to a regeneration process for removing this moisture from the drying cartridges filled with molecular sieves, by which the moisture of the process air, which is carried along, is absorbed.

Basically, several such drying cartridges are used, which are connected in parallel. While at least one of the drying cartridges is operating in the drying phase, the absorbed moisture is removed at the same time from one or more drying cartridges, which are connected in parallel, so that these cartridges are prepared for a new drying phase.

It is, for example, known from the state of the art that the regeneration of the drying cartridges may be conducted according to the so-called co-current principle, according to which the direction of flow in the drying cartridges is the same in the drying phase for the process air and the regeneration phase of the drying cartridge.

In the case of the so-called counter-current principle, the direction of flow during the regeneration of the drying cartridges is opposite to that during the drying process.

The advantage of the counter-current principle lies in the distinctly lower energy consumption during the regeneration. While the drying cartridge is absorbing moisture from the process air during the drying process, it is moistened continuously in the direction of flow. A front, separating the moist region from the dry cartridge, migrates in the direction of flow. In good time, before this "front", so formed and migrating through the drying cartridge, has reached the end of the drying cartridge, the flow of the process air must be switched over to a different drying cartridge while a safety or buffer zone is maintained. By these means, it is ensured that a dry zone is available without temporal interruption and that the drying process can, accordingly, take place continuously without interruption.

For the countercurrent regeneration, the still-remaining dry region of the drying cartridge is now used as the starting point, from which the adjoining, moistened regions of the drying cartridge are dried once again continuously in a direction opposite to the preceding moistening of the drying cartridge. The front, separating the moist from the dry region, now migrates back opposite to its original direction of movement.

In the case of the previously described co-current regeneration, the front, separating the moist from the dry region, rolls over the region of the drying cartridge, which initially remains dry, and initially still absorbs moisture from the region of the drying cartridge, preceding the front separating the moist from a dry region.

Finally, the "by-pass method" is also used in some cases, for which the regeneration of the drying cartridge takes place at all times with a partial amount of the process air. For this purpose, 15 to 20% of the process air is diverted from the main stream, heated to about 220° to 300° C. and supplied to the regenerating drying cartridge. At the end of the drying process, the heating, assigned to the drying cartridge, which is to be regenerated, is switched off and the regenerated drying cartridge is cooled to about 60° C. with the diverted stream of process air. Only when the temperature has been lowered to such a level, is the molecular sieve in the drying cartridge, which is to be regenerated, once again fully effective. At the same time, however, a constantly vented partial amount of the process air must be taken up in the cycle as fresh air, so that the process air, to a certain extent, is additionally loaded with moisture and the drying cartridge in the drying process is saturated more quickly with moisture.

As is evident from the state of the art, there have been numerous efforts to improve the functionality and efficiency of the regeneration.

SUMMARY OF THE INVENTION

It is an object of the invention to create a regeneration process for drying cartridges, which, with the least possible expenditure for equipment and a relatively low consumption of energy, makes possible an optimized regeneration of the drying cartridges.

The invention is explained in greater detail with reference to the accompanying drawings.

DESCRIPTION OF THE PREFERRED EMBODIMENT

Figure 1:
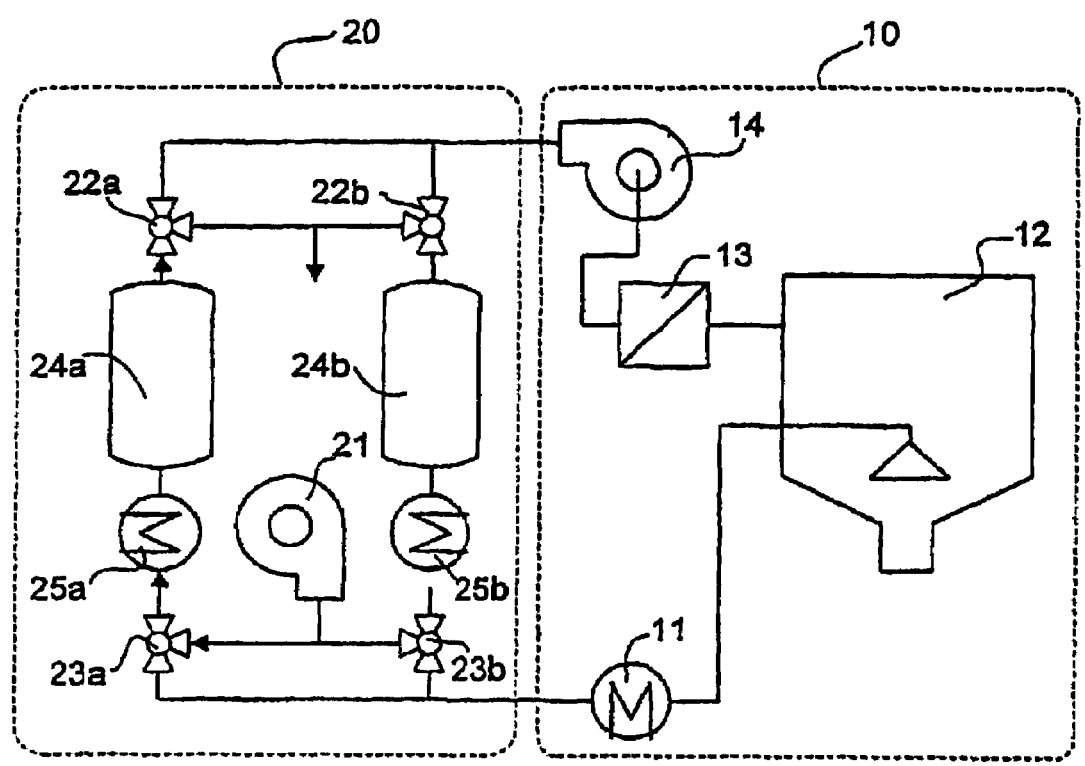
FIG. 1 shows a diagrammatic representation of a device for drying plastic granulate and for regenerating the process air, moistened during the drying process of the plastic granulate with the help of a molecular sieve.

In FIG. 1, the region 10, which is at the right and has a border, shows a drying container 12, to the lower region of which process air, coming from a heater 11, is supplied. The process air flows through the granulate, which is to be dried, and emerges once again from the upper region of the drying container 12. The process air passes through a filter 13 and then reaches a blower 14, from which the process air is passed on to the drying region 20.

At least two drying cartridges 24a and 24b, to which the process air, which is to be dried, can be supplied over the valves 22a and 22b, are disposed in the drying region 20 for the process air.

In a first phase, the process air, which is to be dried or dehumidified, is supplied over a valve 22b to a drying cartridge 24b. As the process air flows through the molecular sieve, disposed in the drying cartridge 24b, the moisture, contained in the process air, is absorbed in the molecular sieve. In the molecular sieve, a moistened inlet region and an adjoining dry region are formed.

At the same time, the front, separating the moist from the dry region, migrates continuously from the inlet region to the outlet region of the drying cartridge 24b.

During the drying process in the drying cartridge 24a, which takes place at the same time, hot atmospheric air is supplied in a first step of the process by a blower 21 over a valve 23a and a heater 25a. The fresh air, heated with the heater 25a to a temperature of about 220° to 300° C., is supplied to the regenerating drying cartridge 24a countercurrent to the direction of flow of the process air, until the front, which separates the dry from the moist region and moves from the bottom to the top, has reached the upper region of the drying cartridge 24a. When the front, separating the dry from the moist region, has reached the upper region of the drying cartridge 24a, the second step of the process is initiated. The heater 25a is switched off and the valve 23a is redirected in such a manner, that dry process air at a temperature of about 60° C. is passed into the drying cartridge 24a, which is to be regenerated, for the purpose of follow-up drying and cooling. Moreover, this dry process air is introduced in a direction opposite to that established for the process air, which is to be dried.

For the processes, described above, it is important that, in good time, before the front separating the moist from the dry region of the drying cartridge 24b, employed for the drying process of the process air, has reached the outlet region of the cartridge, the valves 22a, 22b, 23a and 23b are controlled, so that the process air, which is to be dried, is no longer supplied to the drying cartridge 24b and, instead, is supplied to the previously regenerated, other drying cartridge 24a, through which it now flows from top to bottom.

The processes, described above, proceed now with roles exchanged between drying cartridges 24b and 24a and related heaters 25b and 25a.

Instead of the drying cartridges 24a and 24b, given in the example, further, additional drying cartridges can also be provided. By appropriately selecting the number of drying cartridges for the drying and the regenerating cycle, it is possible to take into account the different periods, during which the drying cartridges 24a and 24b are used for drying the process air on the one hand and regenerating the drying cartridges 24a and 24b on the other.

Since the regenerating process of the drying cartridges 24a and 24b takes place relatively rapidly in relation to the drying process, the cooling phase of the regenerated drying cartridges, which follows the regeneration, can already be used for a drying function of these regenerated drying cartridges, which are to be cooled, and, moreover, optionally in parallel to the other drying cartridge or cartridges.

After the drying cartridge 24a or 24b has been dried with hot air at 220° to 300° C., it must be cooled to a temperature of about 60° C., since the molecular sieve of the drying cartridges 24a, 24b regains its full effectiveness once again only at such a lowered temperature.

A heat exchanger may be provided for the re-cooling process. The unused thermal energy from the regeneration of the drying cartridges 24a, 24b can be transferred with such a heat exchanger to the stream of air drying the material to be dried. However, this can lead to problems particularly in the case of material dried at low temperatures. It may be necessary to decrease the capacity of the heat exchanger or even to provide a refrigerator.

When atmospheric air is used partly or exclusively, the quality of the regeneration, especially during the cooling phase, also depends on the humidity of the atmospheric air. This becomes clear from the adsorption isotherms shown in FIG. 2.

Figure 2:
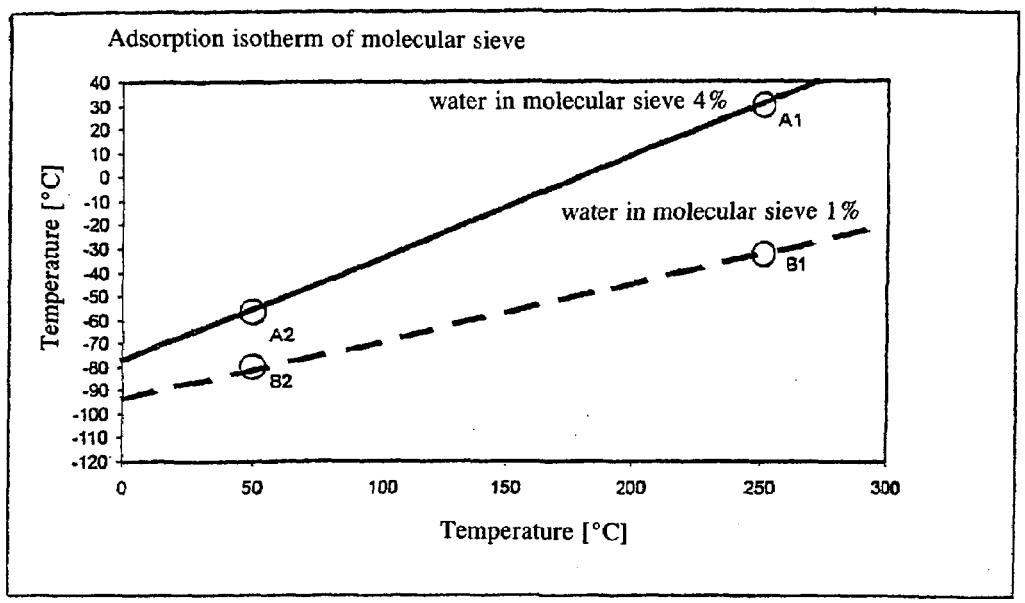
FIG. 2 shows an adsorption isotherm of the molecular sieve.
Figure 3:
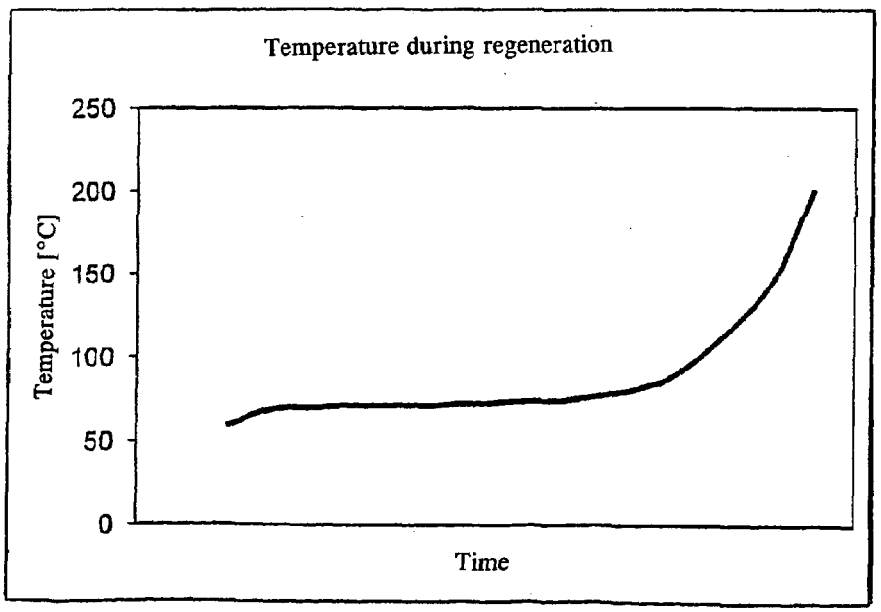
FIG. 3 shows a graphic representation of the variation in temperature during the regeneration.

The process air is heated to about 220° to 300° C. and preferably however 250° C., before it is passed through the drying cartridge 24a or 24b for the purpose of regenerating the cartridge. By these means, the forces binding the water to the molecular sieve in the drying cartridge 24a, 24b are canceled. The water can be taken up by the regenerating air. Energy is consumed. In FIG. 2, the molecular sieve is in state A1. The time, at which the drying cartridge 24a, 24b as a whole no longer gives off any water, can be determined from the variation in temperature at the discharge side of the drying cartridge. At this time, the temperature rises clearly more rapidly, as can be seen in FIG. 3.

In the case of the known method, the molecular sieve reaches the value A2 in the representation of FIG. 2. However, this state also depends on external climatic conditions. Since only state A2 is reached by methods working exclusively with atmospheric air, the dew point of the drier is clearly higher than in the case of the inventive method, for which state B2 is reached. The cause of this is the residual moisture in the molecular sieve.

A partial stream of air, which is diverted from the process air, is used to cool the drying cartridge 24a, 24b. With that, the result of the regeneration depends only on the dew point of the process air. Since a constant dew point of the process air is aimed for and largely achieved, the result of the regeneration is also practically constant.

The energy used for the regeneration is optimized by selecting the countercurrent principle, which has already been explained above.

For the regeneration, atmospheric air is aspirated with the regeneration blower 21, supplied to the regeneration heater 25a by suitable settings of the valve 23a and heated there to a temperature of about 220° to 300° C. The air, so heated, reaches the drying cartridge 24a, which is to be regenerated, where it absorbs moisture from the drying cartridge 24a. At the same time, use is made of the fact that the molecular sieve can absorb less water at higher temperatures. The air, laden with water, is discharged to the atmosphere by a suitable setting of valve of 22a.

In the next step of the process, the regeneration heater 25a is then switched off and the flow of air controlled in such a manner, that already dried process air, having a temperature of about 50 to 60° C., is used for the recooling of the drying cartridge 24a.

Subsequent drying of the drying cartridge 24a takes place in conjunction with the heat stored in the molecular sieve. The subsequent drying is independent of external conditions of temperature and humidity. The molecular sieve strives to reach a lower level with respect to the water content. In FIG. 2, the molecular sieve is now in state B1 and, when all the heat is used up, in state B2.

The flow of air can be controlled with valves 22a, 22b, 23a, 23b in such a manner, that the regenerated drying cartridge 24a can be used once again for drying the process air. Alternately, the process with the drying cartridge 24b proceeds in a very similar manner.

What is claimed is:

1. A method of regenerating a first drying cartridge, said first drying cartridge being previously moistened by providing a first flow of process air in a first flow direction for generating a stream of dried process air in said first flow direction, said regenerating method comprising:
heating atmospheric air from approximately 220° to approximately 300° C. for providing heated air;
providing said heated air to said first drying cartridge in a flow direction that is countercurrent to said first flow direction;
drying a second flow of process air bypassing said second flow of air through a second drying cartridge; and
diverting a partial stream of said second flow of dried process air to said first drying cartridge, subsequent to said step of supplying said heated air to said first drying cartridge, for recoding said first drying cartridge.

2. The method of claim 1, wherein the atmospheric air is heated to 260° C.

3. The method of one of claims 1 or 2, wherein the recooling is carried out wit a partial stream of air having a temperature of about 50° to 60° C.

4. The method of one of claims 1 or 2, wherein after a relatively short regeneration time, the regenerated drying cartridge can already be used in a cooling phase once again for drying process air.

5. Arrangement for carrying out the method of one of claims 1 or 2, wherein said first and second drying cartridges are present, which are provided, on the one hand, with first three-way valves, between which a cross-connection is disposed and, on the other, with second three-way valves, between which a cross-connection is disposed, the second three-way valves being connected indirectly over a heater with said drying cartridge.

6. The arrangement of claim 5, wherein a blower introduces said atmospheric air into said cross-connection between the second three-way valves.

7. The method of claim 1, wherein said second flow of dried process air is provided to said first drying cartridge in a flow direction that is countercurrent to said first flaw direction.

* * * * *